United States Patent Office 2,852,557
Patented Sept. 16, 1958

2,852,557

4-SULFONYL DERIVATIVES OF SALICYLIC ACID

Ernst Schraufstatter, Wuppertal-Elberfeld, Germany, assignor to Schenley Industries, Inc., New York, N. Y., a corporation of Delaware No Drawing. Application April 5, 1955
Serial No. 499,527

Claims priority, application Germany April 9, 1954

6 Claims. (Cl. 260—519)

This invention relates to novel 4-sulfonyl derivatives of salicylic acid.

It is known that the addition of a sulfur group to salicylic acid proceeds with the substitution effected at the 5 position. Thus, for example, in the sulfochlorination of salicylic acid, salicylic acid 5-sulfochloride is exclusively produced.

One object of this invention is a process for the sulfochlorination of salicylic acid which allows the production of salicylic acid 4-sulfochloride in good yield.

A further object of this invention is the production of novel salicylic acid 4-sulfonamides which have been found to constitute valuble pharmaceutical products. These and still further objects will become apparent from the following description:

In accordance with the invention 4-amino salicylic acid is diazotized and reacted with a solution of hydrogen chloride and sulfur dioxide in water and/or organic solvents such as glacial acetic acid, which contain catalytic amounts of a copper salt. The diazotation can be effected prior to the reaction with the hydrogen chloride-sulfur dioxide solution or may be effected in the solution of hydrogen chloride and sulfur dioxide.

The diazotation of the 4-amino salicylic acid is effected in the presence of hydrochloric acid and preferably in the presence of a water-miscible organic acid such as acetic acid. Equimolecular amounts of an alkali metal nitrite or an alcohol nitrite or nitrous acid anhydride should also be present.

The concentration of a hydrochloric acid should be as high as possible. Amounts of hydrochloric acid of at least 2 and up to 10 times the equivalent amount of the 4-amino salicylic acid should be used. The diazotation may be effected at temperatures between about −20° and 10° C.

The reaction of the diazonium chloride with the sulfur dioxide may be effected at temperatures between about −20° C. and +50° C., and may, for example, be effected in sulfur dioxide in the absence of water. If, however, an aqueous solution is employed, the same should be rendered strongly acid with hydrochloric acid. The solid diazonium chloride or zinc chloride double salt may be contacted with liquid sulfur dioxide in an organic solvent such as acetone, dioxane or glacial acetic acid. Alternatively, the diazonium chloride in the form of a concentrated hydrochloric acid solution or suspension may be contacted with a solution of sulfur dioxide in a water-miscible, organic acid, such as acetic acid or gaseous sulfur dioxide, may be introduced into the solution or suspension of the diazonium chloride, preferably with the addition of a water-miscible organic acid such as acetic acid. The contacting should preferably be effected in the presence of a copper catalyst. Copper powder is preferable as the catalyst, although a copper salt soluble in the reaction mixture may be used in amounts of from 0.1 to 5% based on the amount of the diazonium chloride. Without the use of a catalyst, the reaction proceeds more slowly and the yield is much poorer.

The reaction effects an exchange of the 4-amino group for the sulfochloride radical, resulting in the formation of salicylic acid 4-sulfochloride.

It has further been found that, if the salicylic acid 4-sulfochloride thus obtained is reacted with ammonia or amines novel salicylic acid 4-sulfonamides are obtained which constitute valuable pharmaceutical products.

The reaction of the salicylic acid 4-sulfochloride with ammonia or an amine proceeds in the conventional manner. An excess of ammonia or an agent yielding ammonia such as ammonium carbonate may be used. When using an amine as the reactant the use of an excess is also advisable. If equimolecular proportions of ammonia or amine are employed an acid binding agent like sodium bicarbonate, sodium carbonate or alkali metal hydroxide should be present. The reaction may be carried out in an aqueous medium or in an organic solvent, like benzene, ethanol, dioxane etc. or in a mixture of organic solvents. Temperatures of between 0 and 100° C. are applicable, room temperature being preferred.

The salicylic acid 4-sulfonamides produced in accordance with the invention have the general formula:

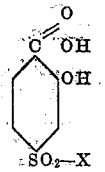

in which X may be a —NH₂ radical, a —NR₂ radical wherein R is a lower aliphatic hydrocarbon radical such as a methyl or propyl radical or a

Furthermore, the new compounds in accordance with the invention may be in the form of an N,N'-bisphenylene diamine, wherein X in the general formula will represent a

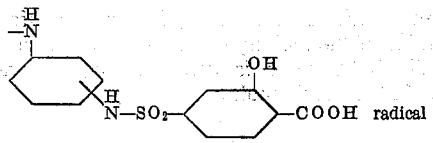

These novel salicylic acid 4-sulfonamides have an extremely high antipyretic and antiarthritic activity. They may be subsequently acylated at the hydroxy group or esterified at the carboxy group in accordance with conventional methods.

The following examples are given by way of illustration and not limitation:

*Example 1*

Three hundred grams of sodium p-amino-salicylate (.2 H₂O) are dissolved in 480 ml. of water and 20 ml. of a 10 percent sodium hydroxide solution and added to a solution of 105 grams of sodium nitrite in 210 ml. of water. The solution obtained is slowly added with strong stirring at −10° C. to 450 ml. of glacial acetic acid and 900 ml. of hydrochloric acid. In the meantime 750 ml. of glacial acetic acid are saturated with sulfur dioxide and 12 grams of cuprous chloride are added thereto. Into this solution the diazo solution, which is partly precipitated, is added with stirring. The desired reaction occurs with evolution of nitrogen. After standing for several hours the reaction solution is suction filtered and the residue washed with water. The washed residue is dissolved in ether leaving slight amounts of a by-product undissolved. Then it is filtered off and the ether evaporated. Salicylic acid 4-sulfochloride is obtained in a yield of 80–90 percent, melting at 190–191° C. with decomposition, and having the formula:

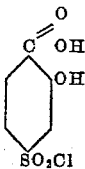

Example 2

Twenty grams of salicylic acid 4-sulfochloride are introduced with cooling into 100 ml. of concentrated aqueous ammonia. The solution is heated carefully for a short period and then cooled and acidified with hydrochloric acid. The precipitate is sucked off and washed with water. After recrystallization from water the salicylic acid 4-sulfonamide melts at 254° C. with decomposition. It has the formula:

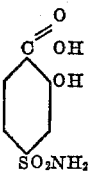

Example 3

15.3 grams of salicylic acid 4-sulfochloride are added with stirring into a mixture of 20 grams of di-n-propylamine and 30 ml. of benzene. After stirring for one hour petroleum ether is added to the solution, the residue is suction filtered and treated with dilute hydrochloric acid. The salicylic acid 4-sulfonyl-di-n-propylamide obtained is recrystallized from 50 percent alcohol and melts at 147° C. It has the formula:

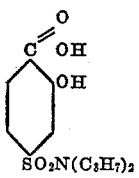

In the same manner salicylic acid 4-sulfonyl-di-n-butylamide of the melting point 135° C. can be obtained when di-n-butyl-amine is used instead of di-n-propylamine. It has the formula:

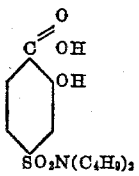

Example 4

Ten and eight-tenths grams of m-phenylene diamine are dissolved in 300 ml. of water and 47.2 grams of salicylic acid 4-sulfochloride and a solution of 16 grams of sodium hydroxide in 80 ml. of water are added in alternate portions with stirring. After standing overnight the precipitated sodium salt is suction filtered, dissolved in hot water and precipitated with hydrochloric acid. The compound obtained has the following formula:

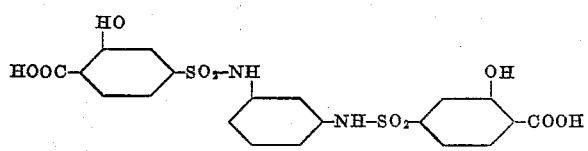

and can be recrystallized from 50 percent alcohol. It melts at 283° C. This compound may be designated N,N' - bis - (3-hydroxy - 4 - carboxy - phenylsulfonyl)-m-phenylene diamine.

The N,N'-bis-(3-hydroxy-4-carboxyphenylsulfonyl)-p-phenylene diamine of the melting point 315° C. is formed by using p-phenylene diamine instead of m-phenylene diamine.

Example 5

Twenty-three and six-tenths grams of salicylic acid 4-sulfochloride are dissolved in 75 ml. of ethanol and 28 ml. of aniline are added with cooling. After standing for some time the reaction mixture is diluted with water and acidified with hydrochloric acid. After recrystallizing from 50 percent alcohol the salicylic acid 4-sulfonic acid anilide obtained melts at 246° C., and has the formula:

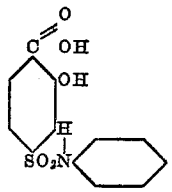

Example 6

Twenty-three and six-tenths grams of salicylic acid 4-sulfochloride are added with stirring and cooling to 50 ml. of a 30 percent dimethyl amine solution. After some hours the reaction mixture is acidified with dilute hydrochloric acid, the residue is separated and recrystallized from 25 percent acetic acid. The salicylic acid 4-sulfonyl-dimethylamide obtained melts at 220° C. and has the formula:

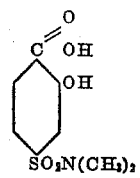

In order to illustrate the pharmaceutical characteristics of the new salicylic acid 4-sulfonamide and to compare the same with the known salicylic acid 5-sulfonamide, the effect of these two compounds, an experimental protein arthritis of rats was examined. A number of experimental animals were given intraperitoneal injections and were administered doses of compounds per os. The amount that the swellings were reduced in the treated animals was compared with the size of the swelling in the untreated control animals. The results are shown in the following table wherein the percent figures indicate the percentage of swelling remaining after the treatment as compared with a 100% swelling of the control animals.

| Dose per rat | Salicylic acid 4-sulfonamide | | Salicylic acid 5-sulfonamide | |
|---|---|---|---|---|
| | intraperitoneal, percent | per os, percent | intraperitoneal, percent | per os, percent |
| 200 mg | 41 | 65 | toxic 100 | 100 |
| 50 mg | 70 | 83 | 99 | 100 |
| 25 mg | 75 | 80 | 100 | 100 |

As may be seen, an appreciable reduction in the swelling occurs with the use of salicylic acid 4-sulfonamide, whereas there is at best an imperceptible effect from the administrations of the salicylic acid 5-sulfonamide. The arthritis may thus be beneficially influenced by the 4-sulfonamide, while the 5-sulfonamide does not show any such beneficial effect.

I claim:
1. A salicylic acid 4-sulfonamide selected from the group of salicylic acid 4-sulfonamides having the general formula:

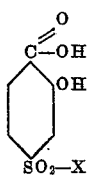

in which X is a member selected from the group consisting of NH₂, NR₂ and

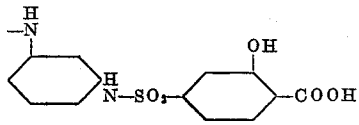

and R is a member selected from the group consisting of lower aliphatic hydrocarbon radicals and a

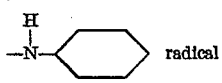 radical

2. As a new chemical compound salicylic acid 4-sulfonamide.

3. As a new chemical compound a salicylic acid 4-sulfonyl-dialkylamide selected from the group consisting of salicylic acid 4-sulfonyl-di-n-propylamide, salicylic acid 4-sulfonyl-di-n-butylamide, and salicylic acid 4-sulfonyl-di-methylamide.

4. As a new chemical compound salicylic acid 4-sulfonic acid anilide.

5. As a new chemical compound a phenylene diamine selected from the group consisting of N,N'-bis-(3-hydroxy-4-carboxyphenylsulfonyl) - m - phenylene diamine and N,N'-bis-(3-hydroxy - 4 - carboxyphenylsulfonyl)-p-phenylene diamine.

6. As a new chemical compound salicylic acid 4-sulfochloride.

References Cited in the file of this patent

UNITED STATES PATENTS 2,233,296    Nelles et al. _____ Feb. 25, 1941

FOREIGN PATENTS 22,854    Great Britain _____ June 11, 1914

OTHER REFERENCES

Rodd: Chemistry of Carbon Compounds, IIIA, pp. 258–261 and 296 (1954).